May 26, 1931.  R. NELSON  1,807,004
SOLDERING PLIERS
Filed April 25, 1929
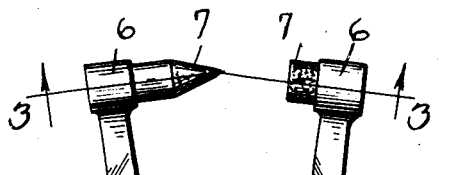
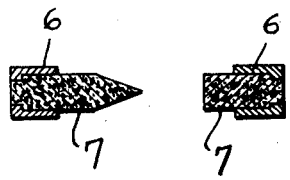
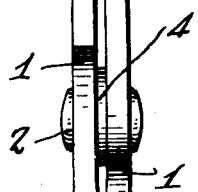
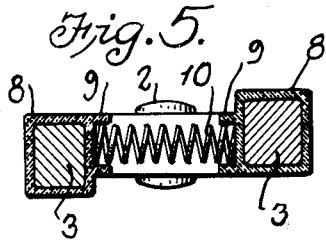
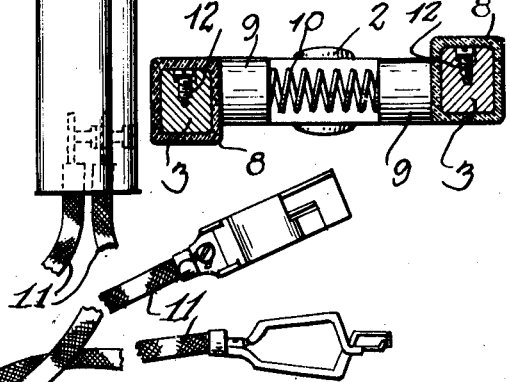
INVENTOR.
Roy Nelson.
BY
ATTORNEY.

Patented May 26, 1931

1,807,004

UNITED STATES PATENT OFFICE

ROY NELSON, OF MINOT, NORTH DAKOTA

SOLDERING PLIERS

Application filed April 25, 1929. Serial No. 358,094.

This invention relates to certain new and useful improvements in soldering pliers and while adaptable for use in various connections, the same is especially designed for use by electricians in radio work, automobile mechanics and jewelers, the present device being distinguished from the ordinary soldering iron by the provision of a pair of carbon contacts through which electricity is flowed in forming a soldering operation.

The primary object of the invention is to provide a pair of soldering pliers comprising a pair of pivoted cross-handles insulated from each other with an electric conductor connected to each handle while the gripping jaw ends of the soldering pliers carry carbon blocks adapted for engagement with the object to be soldered and through which electricity is flowed.

With the above and other objects that will become apparent as the nature of the invention is better understood, the same consists in the novel form, combination and arrangement of parts hereinafter more fully described, shown in the acocmpanying drawings and claimed.

In the drawings:—

Figure 1 is a side elevational view of a pair of soldering pliers constructed in accordance with the present invention;

Figure 2 is an edge elevational view of the pliers;

Figure 3 is a detail sectional view taken on line 3—3 of Figure 1 showing the carbon blocks or tips at the jaw ends of the pliers to engage the work;

Figure 4 is a detail sectional view taken on line 4—4 of Figure 1 showing the insulated pivotal connection between the pliers;

Figure 5 is a detail sectional view taken on line 5—5 of Figure 1 showing the insulation handle grip and separating spring between the handles; and Figure 6 is a detail sectional view taken on line 6—6 of Figure 1 showing the electric conductors anchored to the plier handles and covered by the insulation grips.

The soldering pliers comprises a pair of cross handles 1 pivoted together by the screw 2 affording handle grip ends 3 and jaw ends 4. An insulation connection is formed between the pivot points of the handles 1 as shown in Figure 4, an insulation washer 4 separating the handles 1 while an insulation disk 5 is set into each handle with the pivot screw 2 passing through the washer and disk.

The outer ends of the jaw ends 4 of the pliers are sprocketed as at 6 for the reception of insulation tips or blocks 7 that may assume and configuration desired, one block 7 as shown in Figure 3 having a flat end wall while the cooperating carbon block 7 is of conical formation to provide a point contact.

Each gripping end 3 of the plier handles 1 is provided with an insulation covering 8 terminating at points spaced from the pivot pin 2 with opposed sockets 9 on the handle coverings 8 to receive the ends of a coil spring 9 tending to separate the gripping handles 3 and open the jaw ends 4. A pair of electric conductors 11 are electrically connected as at 12 to the outer ends of the handle grips 3 with the insulation covering overlying the connection.

With electric current flowing from a suitable source through the conductors 11 to the handles 1, the two carbon points are closed upon the object to be soldered and sufficient heat is generated instantly to melt the solder when the carbon points are brought together. By providing both points of the pliers with a carbon block 7, all liability of the object being soldered adhering to the pliers is eliminated as the carbon blocks 7 leave the soldered joints in a clean condition, which would not occur if metallic points were employed. Also, the carbon blocks 7 may be maintained in engagement with the object being soldered and the supply of electricity cut off, the carbon blocks then acting as a clamping device for holding the joints until the solder has become hardened or set. A clip may be attached to each end of the two conductors 11 and secured to the terminals of a radio or automobile battery and the pliers used in repair work on the automobile and in connection with a radio apparatus. The portability of the device permits its use in various places of a confined nature, such as at points rearwardly of the instrument board or the like and will efficiently accomplish all objects ascribed thereto. The pliers may be suitably supported upon a workman's bench, such as for jewelry work and operated by pedal mechanism, leaving both hands free for the manipulation of the devices being worked upon. The device is extremely simple in construction and operation, no adjustment of the parts being required, while no switches are employed in the operation, the moving of the carbon blocks together effecting the heating thereof and the flow of current.

While there is herein shown and described the preferred embodiment of the present invention, it is nevertheless to be understood that minor changes may be made therein without departing from the spirit and scope of the invention as claimed.

I claim:—

1. In a device of the class described, a pair of pivotally connected pliers, comprising jaws and operating arms, means for supplying electricity to the pivoted arms of the pliers comprising leads connected to the ends of the handles of the pliers, carbon points on the soldering ends of the pliers, insulation hand grips on the handles of the pliers, and a compression spring between the insulation grips normally to separate the carbon points.

2. In a device of the class described, a pair of pivotally connected pliers, comprising jaws and operating arms, means for supplying electricity to the pivoted arms of the pliers comprising leads attached to the handle ends of the pliers, an insulation bearing separating the arms of the pliers at the pivot joint, insulation hand grips on the handles of the pliers extending beyond the ends thereof and a compression spring between the insulation grips normally to separate the carbon points.

In testimony whereof I affix my signature.

ROY NELSON.